US009854546B2

(12) United States Patent
Grelier et al.

(10) Patent No.: US 9,854,546 B2
(45) Date of Patent: Dec. 26, 2017

(54) GNSS RADIO SIGNAL FOR IMPROVED SYNCHRONIZATION

(71) Applicant: Centre National d'Etudes Spatiales, Paris (FR)

(72) Inventors: Thomas Grelier, Toulouse (FR); Lionel Ries, Viviers les Montagnes (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 0 days.

(21) Appl. No.: 14/413,498

(22) PCT Filed: Jul. 10, 2013

(86) PCT No.: PCT/EP2013/064573
§ 371 (c)(1),
(2) Date: Mar. 18, 2015

(87) PCT Pub. No.: WO2014/009409
PCT Pub. Date: Jan. 16, 2014

(65) Prior Publication Data
US 2015/0249966 A1  Sep. 3, 2015

(30) Foreign Application Priority Data
Jul. 11, 2012  (FR) ...................... 12 56696

(51) Int. Cl.
*G01S 19/24*  (2010.01)
*H04W 56/00*  (2009.01)
(Continued)

(52) U.S. Cl.
CPC .......... *H04W 56/001* (2013.01); *G01S 19/02* (2013.01); *G01S 19/24* (2013.01); *H04L 7/04* (2013.01); *G01S 19/21* (2013.01)

(58) Field of Classification Search
CPC .......... G01S 19/02; G01S 19/21; G01S 19/24; H04L 7/04; H04W 56/001
(Continued)

(56) References Cited

U.S. PATENT DOCUMENTS 5,331,329 A * 7/1994 Volkov ................... G01S 19/02
342/357.395
5,331,602 A * 7/1994 McLaren ............... G01S 5/0009
367/127

(Continued)

FOREIGN PATENT DOCUMENTS

EP  0 513 349 A1  11/1992

OTHER PUBLICATIONS

"Global Positioning System Directorate Systems Engineering & Integration Interface Specification"; IS-GPS-200F; Sep. 21, 2011; pp. 1-220.
(Continued)

*Primary Examiner* — Andrew Lai
*Assistant Examiner* — Mahmudul Hasan
(74) *Attorney, Agent, or Firm* — Pearne & Gordon LLP

(57) ABSTRACT

A global navigation satellite system ("GNSS") positioning method is provided, based upon a GNSS radio signal that comprises a navigation message transmitted as a succession of data packets. Each data packet is present in the GNSS radio signal as a sequence of symbols obtained by application of a code preceded by a synchronization symbol header. The data packets are organized internally into data fields. At least certain data packets of the succession of data packets contain a synchronization bit field translated by application of the code into a synchronization symbol pattern.

15 Claims, 8 Drawing Sheets

Galileo I/NAV navigation message on E1-B
Frame (720 s)
24 subframes
Subframe (30 s)
15 pages
Page (2 s)

(51) Int. Cl.
  *G01S 19/02* (2010.01)
  *H04L 7/04* (2006.01)
  *G01S 19/21* (2010.01)

(58) Field of Classification Search
  USPC .................................. 342/357.12, 357.44
  See application file for complete search history.

(56) References Cited

U.S. PATENT DOCUMENTS

| | | | | |
|---|---|---|---|---|
| 6,118,825 | A * | 9/2000 | Ikeda | H03D 1/00 375/259 |
| 7,940,834 | B2 * | 5/2011 | Gildea | G01S 19/24 375/142 |
| 2002/0049536 | A1 * | 4/2002 | Gaal | G01S 19/27 714/758 |
| 2002/0137464 | A1 * | 9/2002 | Dolgonos | H04B 7/022 455/60 |
| 2004/0087270 | A1 * | 5/2004 | Krasner | G01S 19/246 455/12.1 |
| 2005/0129096 | A1 * | 6/2005 | Zhengdi | G01S 19/21 375/150 |
| 2006/0250302 | A1 * | 11/2006 | Park | G01S 5/0289 342/357.43 |
| 2006/0276198 | A1 * | 12/2006 | Michelon | G01S 19/11 455/456.1 |
| 2007/0135079 | A1 * | 6/2007 | Bromley | H04L 7/042 455/343.1 |
| 2009/0109091 | A1 * | 4/2009 | Thind | G01S 19/24 342/357.63 |
| 2009/0285268 | A1 * | 11/2009 | Gildea | G01S 19/24 375/149 |
| 2009/0309791 | A1 * | 12/2009 | Chen | G01S 19/24 342/357.62 |
| 2010/0013702 | A1 * | 1/2010 | Lin | G01S 19/05 342/357.43 |
| 2010/0220004 | A1 * | 9/2010 | Malkos | G01S 19/05 342/357.62 |
| 2010/0232351 | A1 * | 9/2010 | Chansarkar | G01S 19/25 370/320 |
| 2010/0254492 | A1 * | 10/2010 | Chen | G01S 19/24 375/329 |
| 2011/0074627 | A1 * | 3/2011 | Morrison | G01S 1/042 342/357.48 |
| 2011/0110338 | A1 * | 5/2011 | Khoryaev | G01S 5/0215 370/335 |
| 2011/0200074 | A1 * | 8/2011 | Crosta | G01S 19/29 375/147 |
| 2011/0261805 | A1 * | 10/2011 | Landry, Jr. | G01S 19/24 370/342 |
| 2012/0198307 | A1 * | 8/2012 | Kibe | H03M 13/11 714/758 |
| 2013/0002480 | A1 * | 1/2013 | Pratt | G01S 19/42 342/357.25 |
| 2013/0141278 | A1 * | 6/2013 | Rao | G01S 19/02 342/357.44 |

OTHER PUBLICATIONS

"Galileo—European GNSS Open Service—Signal in Space Interface Control Document"; OS SIS IDC, Issue 1.1; Sep. 2010; pp. 1-196.

Spilker, J.J., Jr.; "GPS Signal Structure and Performance Characteristics"; Navigation: Jornal of the Institute of Navigation; vol. 25, No. 2, Summer 1978; pp. 121-146.

International Search Report for Corresponding PCT Application No. PCT/EP2013/064573; dated Aug. 21, 2013.

International Preliminary Report on Patentability of Corresponding Application No. PCT/EP2013/064573; dated Jan. 11, 2015.

* cited by examiner

Fig. 3

| T₀ | Content | Odd/even & page type | Data 1/2 | Tail | | Odd/even & page type | Data 2/2 | Reserved 1 | SAR | free | CRC | Reserved 2 | Tail |
|---|---|---|---|---|---|---|---|---|---|---|---|---|---|
|  |  | 2 | 112 | 6 |  | 2 | 16 | 40 | 22 | 2 | 24 | 8 | 6 |
| 0 | Word 2 |  |  |  |  |  |  |  |  |  |  |  |  |
| 2 | Word 4 |  |  |  |  |  | Synchro 1 |  |  |  |  |  |  |
| 4 | Word 6 |  |  |  |  |  | Synchro 1 |  |  |  |  |  |  |
| 6 | Word 7 or 9 |  |  |  |  |  | Synchro 1 |  |  |  |  |  |  |
| 8 | Word 8 or 10 |  |  |  |  |  | Synchro 1 |  |  |  |  |  |  |
| 10 | Reserved (SoL) |  |  |  |  |  |  | Synchro 1 |  |  |  |  |  |
| 12 | Reserved (SoL) |  |  |  |  |  |  | Synchro 1 |  |  |  |  |  |
| 14 | Reserved (SoL) |  |  |  |  |  |  | Synchro 1 |  |  |  |  |  |
| 16 | Reserved (SoL) |  |  |  |  |  |  | Synchro 1 |  |  |  |  |  |
| 18 | Reserved (SoL) |  |  |  |  |  |  | Synchro 1 |  |  |  |  |  |
| 20 | Word 1 |  |  |  |  |  |  | Synchro 1 |  |  |  |  |  |
| 22 | Word 3 |  |  |  |  |  |  | Synchro 1 |  |  |  |  |  |
| 24 | Word 5 |  |  |  |  |  |  | Synchro 1 |  |  |  |  |  |
| 26 | (free) |  |  |  |  |  |  | Synchro 1 |  |  |  |  |  |
| 28 | (free) |  |  |  |  |  |  | Synchro 1 |  |  |  |  |  |

Fig. 4

| T₀ | Content | Odd/even & page type | Data 1/2 | Tail |
|---|---|---|---|---|
| | | 2 | 112 | 6 |
| 0 | Word 2 | | | |
| 2 | Word 4 | | | |
| 4 | Word 6 | | | |
| 6 | Word 7 or 9 | | | |
| 8 | Word 8 or 10 | | | |
| 10 | Reserved (SoL) | | | |
| 12 | Reserved (SoL) | | | |
| 14 | Reserved (SoL) | | | |
| 16 | Reserved (SoL) | | | |
| 18 | Reserved (SoL) | | | |
| 20 | Word 1 | | | |
| 22 | Word 3 | | | |
| 24 | Word 5 | | | |
| 26 | (free) | | | |
| 28 | (free) | | | |

| Odd/even & page type | Data 2/2 | Reserved 1 | SAR | free | CRC | Reserved 2 | Tail |
|---|---|---|---|---|---|---|---|
| 2 | 16 | 40 | 22 | 2 | 24 | 8 | 6 |
| | | Synchro 1 | | | | | |
| | | Synchro 2 | | | | | |
| | | Synchro 3 | | | | | |
| | | Synchro 1 | | | | | |
| | | Synchro 2 | | | | | |
| | | Synchro 3 | | | | | |
| | | Synchro 1 | | | | | |
| | | Synchro 2 | | | | | |
| | | Synchro 3 | | | | | |
| | | Synchro 1 | | | | | |
| | | Synchro 2 | | | | | |
| | | Synchro 3 | | | | | |
| | | Synchro 1 | | | | | |
| | | Synchro 2 | | | | | |
| | | Synchro 3 | | | | | |

Fig. 5

| $T_0$ | Content | Odd/even & page type | Data 1/2 | Tail |
|---|---|---|---|---|
| | | 2 | 112 | 6 |
| 0 | Word 2 | | | |
| 2 | Word 4 | | | |
| 4 | Word 6 | | | |
| 6 | Word 7 or 9 | | | |
| 8 | Word 8 or 10 | | | |
| 10 | Reserved (SoL) | | | |
| 12 | Reserved (SoL) | | | |
| 14 | Reserved (SoL) | | | |
| 16 | Reserved (SoL) | | | |
| 18 | Reserved (SoL) | | | |
| 20 | Word 1 | | | |
| 22 | Word 3 | | | |
| 24 | Word 5 | | | |
| 26 | (free) | | | |
| 28 | (free) | | | |

| Odd/even & page type | Data 2/2 | Reserved 1 | SAR | free | CRC | Reserved 2 | Tail |
|---|---|---|---|---|---|---|---|
| 2 | 16 | 40 | 22 | 2 | 24 | 8 | 6 |
| | | Synchro 1 | | | | | |
| | | Synchro 1 | | | | | |
| | | Synchro 1 | | | | | |
| | | Synchro 1 | | | | | |
| | | Synchro 1 | | | | | |

Fig. 6

| T₀ | Content | Odd/even & page type | Data 1/2 | Tail |
|---|---|---|---|---|
| | | 2 | 112 | 6 |
| 0 | Word 2 | | | |
| 2 | Word 4 | | | |
| 4 | Word 6 | | | |
| 6 | Word 7 or 9 | | | |
| 8 | Word 8 or 10 | | | |
| 10 | Reserved (SoL) | | | |
| 12 | Reserved (SoL) | | | |
| 14 | Reserved (SoL) | | | |
| 16 | Reserved (SoL) | | | |
| 18 | Reserved (SoL) | | | |
| 20 | Word 1 | | | |
| 22 | Word 3 | | | |
| 24 | Word 5 | | | |
| 26 | (free) | | | |
| 28 | (free) | | | |

| Odd/even & page type | Data 2/2 | Reserved 1 | SAR | free | CRC | Reserved 2 | Tail |
|---|---|---|---|---|---|---|---|
| 2 | 16 | 40 | 22 | 2 | 24 | 8 | 6 |
| | | Synchro 2 | | | | | |
| | | Synchro 2 | | | | | |
| | | | | | | | |
| | | Synchro 2 | | | | | |
| | | | | | | | |
| | | Synchro 2 | | | | | |
| | | Synchro 2 | | | | | |

Fig. 7

| T₀ | Content | Odd/even & page type (2) | Data 1/2 (112) | Tail (6) | Odd/even & page type (2) | Data 2/2 (16) | Reserved 1 (40) | SAR (22) | free (2) | CRC (24) | Reserved 2 (8) | Tail (6) |
|---|---|---|---|---|---|---|---|---|---|---|---|---|
| 0 | Word 2 | | | | | | | | | | | |
| 2 | Word 4 | | | | | | | | | | | |
| 4 | Word 6 | | | | | | Synchro 3 | | | | | |
| 6 | Word 7 or 9 | | | | | | | | | | | |
| 8 | Word 8 or 10 | | | | | | | | | | | |
| 10 | Reserved (SoL) | | | | | | Synchro 3 | | | | | |
| 12 | Reserved (SoL) | | | | | | | | | | | |
| 14 | Reserved (SoL) | | | | | | Synchro 3 | | | | | |
| 16 | Reserved (SoL) | | | | | | | | | | | |
| 18 | Reserved (SoL) | | | | | | Synchro 3 | | | | | |
| 20 | Word 1 | | | | | | | | | | | |
| 22 | Word 3 | | | | | | Synchro 3 | | | | | |
| 24 | Word 5 | | | | | | | | | | | |
| 26 | (free) | | | | | | | | | | | |
| 28 | (free) | | | | | | | | | | | |

GNSS RADIO SIGNAL FOR IMPROVED SYNCHRONIZATION

FIELD OF THE INVENTION

The present invention concerns the technological field of satellite radionavigation. The invention is concerned with a global navigation satellite system ("GNSS") positioning method that is based upon the radionavigation signals transmitted by satellites (hereafter "GNSS radio signals" or "GNSS signals"), in particular with the navigation message communicated by these signals to the user receivers in order to enable or facilitate geopositioning by said receivers.

BACKGROUND OF THE INVENTION

GNSS signals (the "Signal-in-Space" segment) are the main interface between a GNSS ("Global Navigation Satellite System") spatial infrastructure and the various user segments thereof. In this respect, it plays a major part in the performance which will be available to a user in a given environment and use context. This is because performance is the result of the receiving algorithms used (a function of the use context) and of the quality of the signal which reaches the user (affected by propagation conditions).

The spectral and temporal characteristics of the signal, such as carrier frequency, power or modulation (PRN, BPSK, BOC rate) parameters, substantially determine performance in terms of interoperability, tracking and interference and multipath robustness, etc.

The navigation message itself is also a predominant factor in performance. It determines the services in terms of content, but also, by means of its structure, in terms of availability (robustness) and latency (or responsiveness). The navigation message contains, inter alia, a set of ephemeris and clock correction data ("DECH") from the transmitting satellite. The set of DECH is taken to mean a set of data sufficient to permit the receiver to compute the satellite position and the satellite clock error. The navigation message makes a significant contribution to acquisition performance, in particular to acquisition time (also known as "Time To First Fix").

However, the design of a GNSS signal and its navigation message are also the result of a compromise between the various intended service requirements and content (for example and for Galileo: Open Service (OS), Safety of Life (SoL), Search And Rescue Return Link Message (SAR RLM), etc.), sometimes conflicting performance objectives (responsiveness and robustness), and operational or technological constraints (interoperability, mass/consumption/volume of the satellites, etc.).

The Galileo E1 OS and GPS L1C signals thus incorporate numerous changes in comparison with the GPS C/A signal: new navigation message structure, PRN code, optimized modulation schemes, etc. Both signals are directed inter alia towards open service, essentially intended for consumer receivers, and often operate in a difficult environment (urban canyon, for example). However, these two signals differ significantly in their design: the L1C GPS signal is solely directed towards open service, whereas the Galileo OS signal was designed both to handle open service and to supply real-time integrity data (SoL) and the SAR return link channel (SAR RLM). As a consequence, the Galileo message does not solely contain items of ephemeris and time (clock correction) data, but also additional items of data.

It will be noted that the synchronization data broadcast in the navigation message in particular from the Galileo Open Service (Galileo OS) suffer from a lack of robustness. Since this information is necessary for calculating the position of the receiver, the low level of robustness adversely affects the performance of Galileo receivers in terms of acquisition threshold, in particular in "difficult" environments, such as urban canyons or inside buildings.

SUMMARY OF THE INVENTION

It is an object of the present invention to provide a global navigation satellite system ("GNSS") positioning method that can increase the robustness of a GNSS signal carrying useful information, in particular a navigation message.

GENERAL DESCRIPTION OF THE INVENTION

In order to solve the above-mentioned problem, a GNSS radio signal is proposed which comprises a navigation message transmitted as a succession of data packets (e.g "pages" or "half-pages"), optionally organized into groups (frames) and/or subgroups (subframes), each data packet taking the form in the GNSS radio signal of a sequence of symbols obtained by application of a code (ensuring transposition of the binary message into a code word) preceded by a synchronization symbol header. The data packets are organized internally into data fields. According to the invention, at least certain data packets of the succession of data packets contain a synchronization bit field translated by application of the code into a synchronization symbol pattern.

It will therefore be understood that the navigation message comprises, at the level of the symbols modulated on the carrier frequency, a plurality of groups of synchronization symbols: the synchronization symbol header marking the start of each data packet together with the synchronization symbol pattern appearing on certain packets. It will be noted that the synchronization symbol header has no equivalent at the level of the binary message (the header is added to the sequence of symbols prior to transmission), whereas the synchronization symbol pattern corresponds to a sequence of bits incorporated into the binary sequence of the navigation message. This sequence of bits is selected so as to reveal the desired synchronization pattern after encoding.

Given that certain data packets consequently have a plurality of sequences of synchronization symbols (header and pattern) known in advance by the receivers, detection of the navigation message by a receiver is made more reliable in particular under low signal to noise ratio conditions.

Preferably, at least one data packet per subframe contains the synchronization bit field translated by application of the code into the synchronization symbol pattern. More advantageously, at least every sixth data packet of the succession of data packets contains the synchronization bit field translated by application of the code into the synchronization symbol pattern.

According to one advantageous embodiment of the invention, each data packet of the succession of data packets contains the synchronization bit field translated by application of the code into the synchronization symbol pattern.

The synchronization symbol pattern and/or its position in a subgroup (subframe) of data packets may be specific to a transmitter (satellite or pseudolite) or a group of transmitters. In this case, the synchronization symbol pattern and/or its position in a group (subframe) of data packets identifies the transmitter or the group of transmitters of the GNSS radio signal. For the purposes of use of the invention in a GNSS, it is then possible to define a plurality of groups of transmitters (satellite and/or pseudolite), each group broadcasting a synchronization pattern at a different moment in time (of the subframe).

According to one preferred embodiment of the invention, the at least certain data packets of the succession of data packets each contain a synchronization bit field selected from a plurality of different synchronization bit fields such that different synchronization symbol patterns alternate at the level of the succession of packets. It will be understood that a plurality of synchronization symbol patterns increases the ambiguity time, e.g. if three synchronization symbol patterns alternate on packets which each have a duration of 2 s, the ambiguity obtained is 6 s. The value of this approach is that the constraint on the accuracy with which system time is known is relaxed for the receiver.

Preferably, the code used to transpose the binary symbols message is an error-correcting code. The code may, in particular, by a convolutional code, e.g. of constraint length 7 and of coding rate ½ (as is the case for the navigation message of the Galileo OS E1 signal).

The synchronization bit field preferably comprises padding bits which take account of the constraint length of the convolutional code. The memory effect of the convolutional code results in the first symbols obtained by application of the code to the synchronization bit field depending on the content of the previous field. The padding bits make it possible to ensure that the synchronization pattern is not affected by a change in the content of the previous field.

Another aspect of the invention concerns a GNSS positioning method which comprises reception of a plurality of GNSS radio signals as described above. Reception comprises detection (optionally but not necessarily also decoding) of the navigation message. Detection of the navigation message comprises identification of said synchronization symbol pattern, for example in addition to detection of the synchronization symbol header.

It will be understood that the GNSS positioning method may be an assisted GNSS positioning method (A-GNSS method) in which the items of information contained in the navigation message or similar items of information are transmitted to the receiver by a transmission channel other than the navigation message. It will be noted, in particular, that the presence of the synchronization symbol pattern allows an A-GNSS receiver to synchronize better with the navigation message without needing to decode it (and gain access to its content).

Another aspect of the invention concerns a GNSS receiver provided with memory means containing a computer program, i.e., non-transitory computer readable medium for storing the computer program, with instructions causing the GNSS receiver to carry out the GNSS positioning method described briefly above when the computer program is run by the GNSS receiver.

Finally, the invention also extends to a computer program product comprising non-transitory computer readable medium with computer program instructions causing a GNSS receiver to carry out the positioning method when the computer program is run by the GNSS receiver.

BRIEF DESCRIPTION OF THE DRAWINGS

Other distinctive features and characteristics of the invention will emerge from the detailed description of some advantageous embodiments given below by way of illustration with reference to the appended drawings, in which:

FIG. 3: is a diagram of the structure of a subframe of the I/NAV radionavigation message modified according to a first variant of the invention;

FIG. 4: is a diagram of the structure of a subframe of the I/NAV radionavigation message modified according to a second variant of the invention;

FIGS. 5-7: are diagrams of the structure of a subframe of the I/NAV radionavigation message modified according to a third variant of the invention;

DESCRIPTION OF A PREFERRED EMBODIMENT

The embodiment of the invention discussed below is based on the I/NAV navigation message transmitted on the E1-B component (data channel of the E1 OS signal) of the Galileo navigation system, which said embodiment proposes to modify. It should, however, be noted that this choice has been made purely for the purposes of illustrating the invention, which can also be carried out on other GNSS signals (from Galileo, GPS, Glonass, Compass etc.). Further information about the I/NAV message may be obtained by consulting the document "European GNSS (Galileo) Open Service Signal in Space Interface Control Document" (hereafter Galileo OS SIS ICD), version 1.1, September 2010, published by the European Commission on the site: http://ec.europa.eu/enterprise/policies/satnav/galileo/open-service/index_en.htm.

Figure 1:
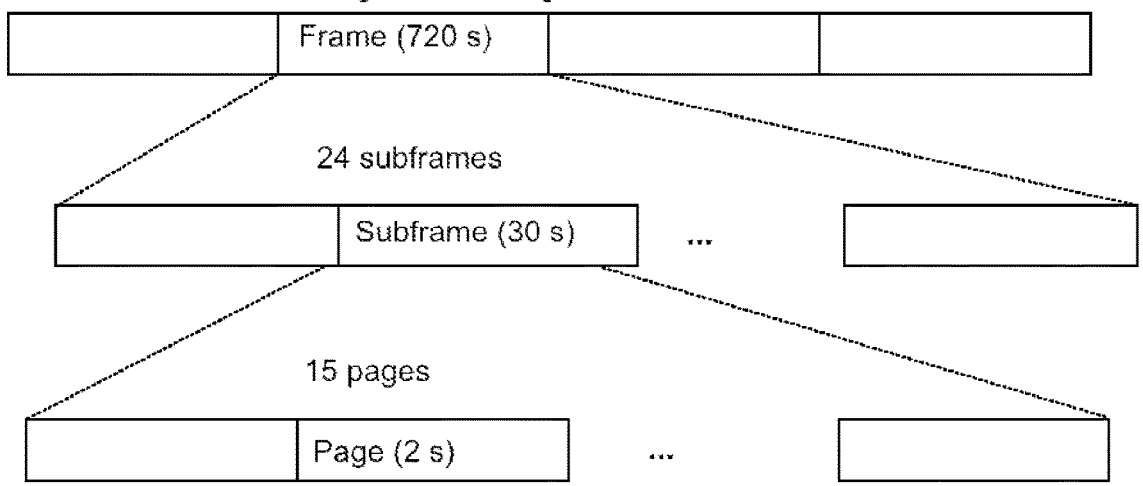
FIG. 1: is a diagram of the structure of a Galileo I/NAV radionavigation signal provided on the E1-B signal component.

The Galileo I/NAV message consists of a frame of 720 seconds, divided into 24 subframes each of 30 seconds. The latter are composed of 15 pages of 2 seconds, each page being composed of an even part and an odd part lasting 1 second. The structure of the I/NAV message is schematically illustrated in FIG. 1.

The even and odd parts of a page are composed of 120 bits of useful data, a complete page therefore containing 240 bits of useful information. These bits are encoded with a convolutional code (of constraint length L=7 and of coding rate R=½). The 120 bits of useful data are converted into 240 symbols after encoding, to which a 10-symbol synchronization header is added. A half-page therefore contains 250 symbols.

Figure 2:
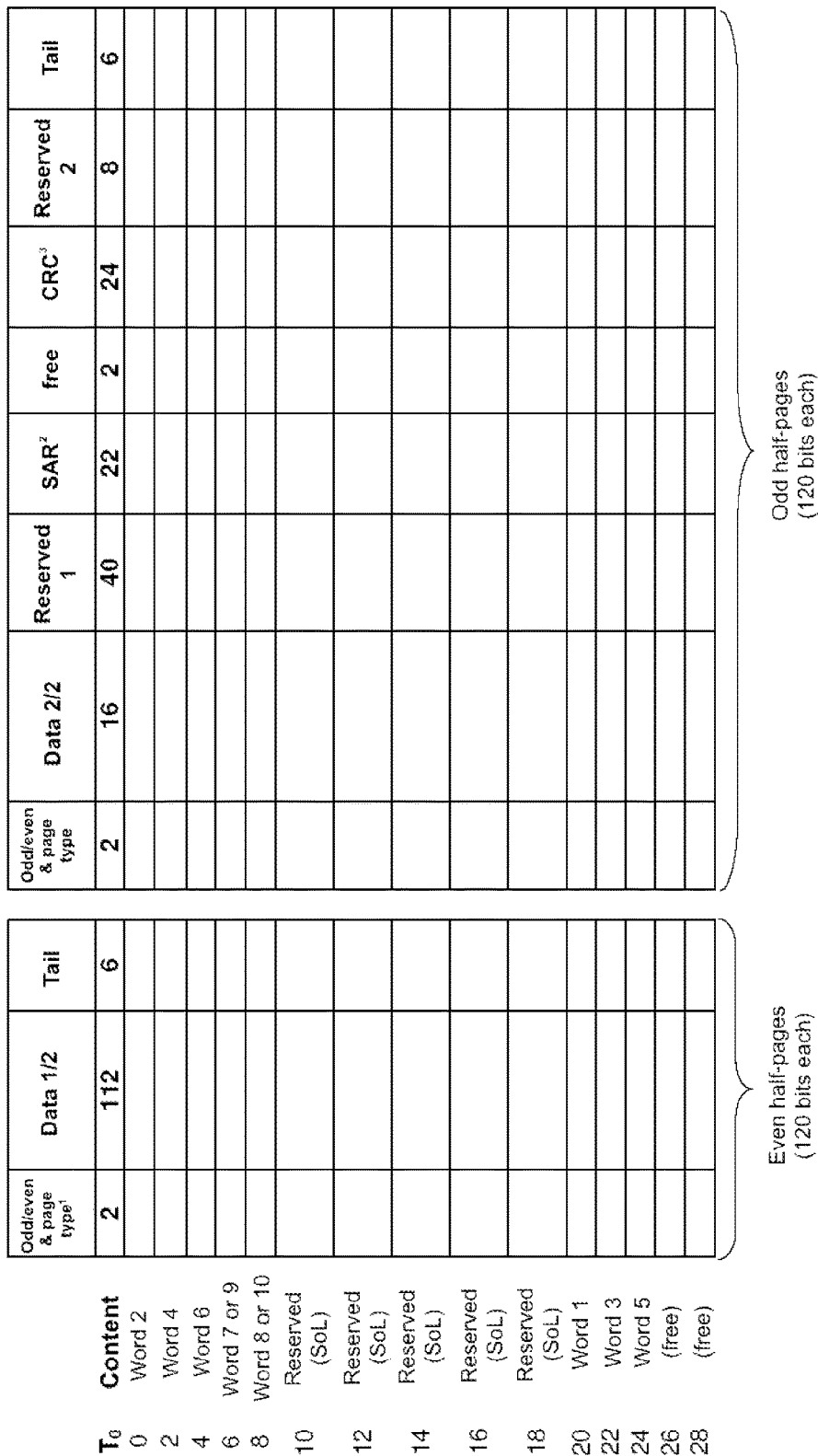
FIG. 2: is a diagram of the structure of a subframe of the I/NAV radionavigation message on the E1-B signal component.

FIG. 2 illustrates the configuration of a subframe of the Galileo OS E1-B. Each page (an odd half-page and even half-page) contains a 128 bit data field, known as "word" and spread over the two parts of the page (divided into 16 and 112 bits respectively).

The words contain the items of information used by the navigation receiver to compute its position (ephemeris, Galileo system time, clock corrections, ionospheric corrections, almanacs, etc.).

Ten types of words are defined in the Galileo OS SIS ICD depending on their content (words 1 to 10); an eleventh type is reserved for "spare" (free) words, i.e. which contain no useful information.

The half-pages represent data packets which, after encoding, are preceded by synchronization symbol headers. To apply the invention to the Galileo OS E1-B signal, it is proposed, for the purposes of this illustrative example, to provide the "Reserved 1" field of each odd half-page with a binary synchronization word. This field is 40 bits in size. It is therefore a question of defining a sequence of 40 bits which will become a synchronization symbol pattern once converted into 80 symbols by the convolutional code. The memory effect of said code (L=7 and R=½) makes the first 12 symbols unknown. The synchronization information can therefore only be encoded over 68 symbols.

It is possible to select a sequence of synchronization bits (including the padding bits provided to take account of the convolutional code memory effect) which allows the acquisition threshold to be lowered by more than 3 dB. It is a question of selecting a sequence of synchronization bits which, by application of the convolutional code, results in a synchronization symbol pattern having suitable autocorrelation properties.

According to a first variant of the example, illustrated in FIG. 3, the same synchronization bit field (i.e. the same sequence of bits) is inserted in the "Reserved 1" field of each odd half-page. The resultant time ambiguity is 2 s.

According to a second variant of the example, illustrated in FIG. 4, three different synchronization bit fields alternate in the "Reserved 1" field of the odd half-pages of each subframe. The resultant time ambiguity is 6 s.

A third variant (addition of spatial diversity) is illustrated in FIGS. 5 to 7. Consideration is given to $N_g$ groups of $N_{sat}$ satellites. All the satellites of one and the same group broadcast the synchronization symbol pattern at the same times in the subframe.

The groups broadcast the synchronization symbol pattern at different times. The value of this approach lies in the fact that the time ambiguity is multiplied by $N_g$, which relieves the constraint on the accuracy with which system time is known.

With three groups of 10 Galileo satellites per group, a time ambiguity of 6 s is reached. The first group broadcasts a first synchronization pattern in the pages starting at times $T_0$=0, 6, 12, 18 and 24 (FIG. 5). The second group broadcasts a second synchronization pattern in the pages starting at times $T_0$=2, 8, 14, 20 and 26 (FIG. 6). The third group broadcasts a third synchronization pattern in the pages starting at times $T_0$=4, 10, 16, 22 and 28 (FIG. 7).

Figure 8:
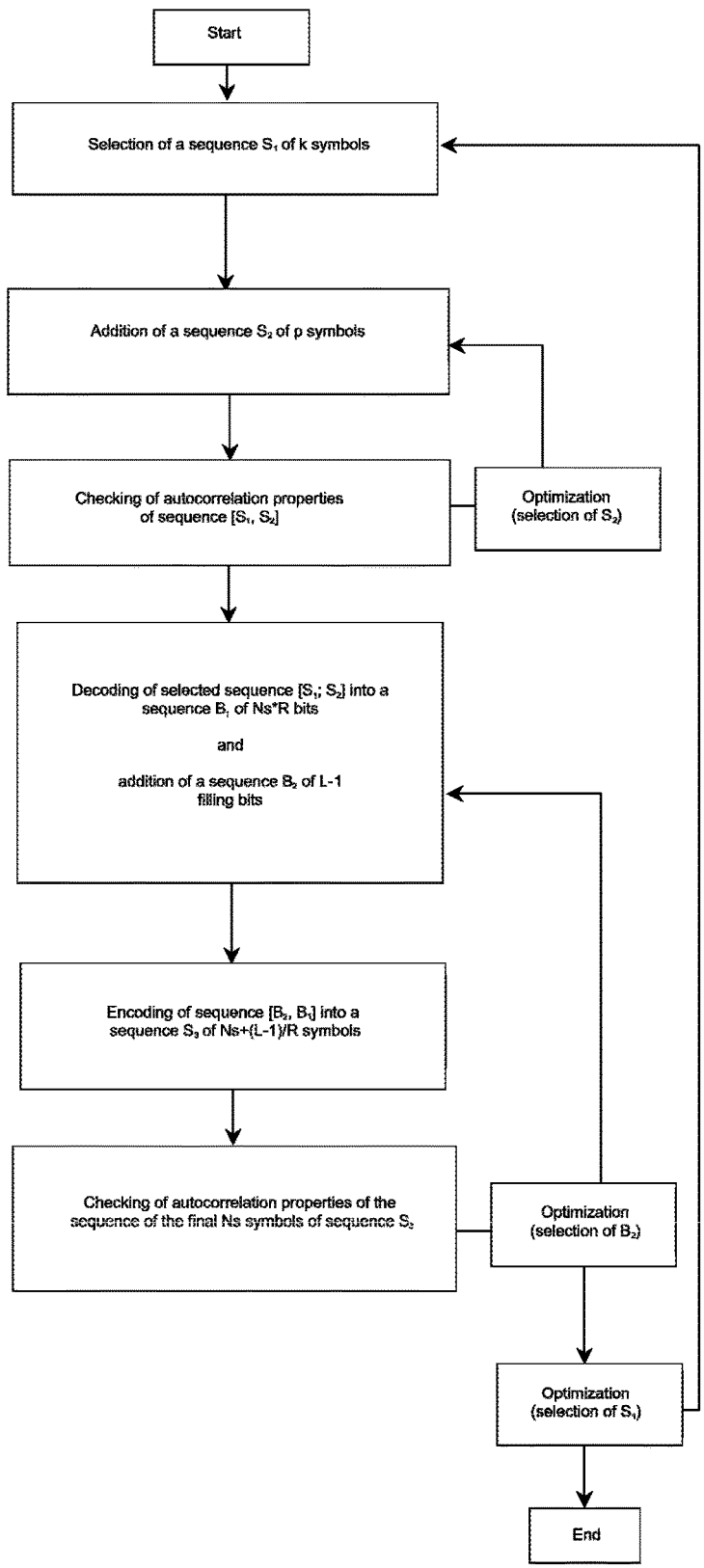
FIG. 8: is a chart illustrating a method for generating a synchronization symbol pattern.

FIG. 8 illustrates a possible method for finding synchronization symbol patterns (and the corresponding bit sequence). $N_s$ is noted as being the length (in symbols) of the synchronization symbol pattern. (In the example of the "Reserved 1" field, $N_s$=68 because the first 12 symbols depend on the content of the previous field.) The aim is to determine a sequence of $N_s$ symbols having optimum synchronization properties, that is to say satisfying a certain number of performance criteria over the autocorrelation function of the sequence (an autocorrelation function similar to that of white noise is sought, i.e. closest to the Kronecker delta function).

It is possible to proceed in the manner illustrated in FIG. 8. A sequence $S_1$ of symbols of length $k=2^n-1$ is selected, with n denoting an integer and $k<N_s$. In particular, an m-sequence (known also as a "maximum length sequence") will be selected, a pseudo-random sequence having optimum autocorrelation properties (very close to those of white noise). A sequence $S_2$ of symbols of length $p=N_s-k$ is then sought, such that the concatenated sequence $[S_1, S_2]$ satisfies the conditions defined in terms of autocorrelation properties. There are $2^p$ candidate sequences for the sequence $S_2$. When seeking the sequence $S_2$, the best candidate sequence is thus selected from all the possible sequences.

The concatenated sequence $[S_1, S_2]$ of $N_s$ symbols is then decoded (e.g. using a Viterbi decoder) to find a sequence $B_1$ of $N_s \cdot R$ bits (R=coding rate of the correcting code). For this stage, it is necessary to find a sequence $B_2$ of L-1 bits (L=constraint length of the convolutional code) to be placed in front of the sequence $B_1$ which gives rise (by application of the correcting code) to the "best" symbol sequence $S_3$ of length $N_s+(L-1)/R$. The "best" sequence of symbols is taken to mean the sequence, the final $N_s$ symbols of which have the best autocorrelation properties. Since there are $2^{L-1}$ possible sequences of L-1 filling bits, $2^{L-1}$ candidate symbol sequences must be evaluated. Among the latter, the one which has the best synchronization properties is chosen.

The method is repeated for a set of symbol sequences $S_1$ of length k. The sequence of $N_s$ symbols and the sequence of L-1 filling bits which produce the best result are finally selected.

The invention claimed is:

1. A global navigation satellite system ("GNSS") positioning method, comprising the steps of:
   providing unencoded data comprising a synchronization bit field;
   applying a code to the unencoded data to produce an encoded sequence of symbols;
   forming a data packet internally organized into data fields, the data packet comprising a synchronization symbol header followed by the encoded sequence of symbols;
   transmitting a GNSS radio signal comprising a navigation message that is transmitted as a succession of data packets;
   wherein the encoded sequence of symbols contains a synchronization symbol pattern that is obtained by application of said code to the synchronization bit field of the unencoded data.

2. The positioning method according to claim 1, further comprising the step of detecting the encoded navigation message by identifying said synchronization symbol pattern.

3. The positioning method according to claim 1, wherein at least each sixth data packet of the succession of data packets contains the synchronization symbol pattern obtained by application of said code to the synchronization bit field.

4. The positioning method according to claim 1, wherein each data packet of the succession of data packets contains the synchronization symbol pattern obtained by application of said code to the synchronization bit field.

5. The positioning method according to claim 1, wherein the synchronization symbol pattern and/or a position thereof in a subgroup of data packets identifies a transmitter or a group of transmitters of the GNSS radio signal.

6. The positioning method according to claim 1, wherein at least certain data packets of the succession of data packets each contain a synchronization bit field selected from a plurality of different synchronization bit fields such that different synchronization symbol patterns alternate at the level of the succession of packets.

7. The positioning method according to claim 1, wherein said code is an error-correcting code.

8. The positioning method according to claim 7, wherein said code is a convolutional code, with a constraint length of 7 and coding rate of ½.

9. The positioning method according to claim 8, wherein the synchronization bit field comprises padding bits which take account of the constraint length of the convolutional code.

10. The positioning method according to claim 1, further comprising the step of organizing the data packets into groups and/or subgroups.

11. A global navigation satellite system ("GNSS") positioning method comprising the steps of:
   receiving a plurality of GNSS radio signals that comprise an encoded navigation message transmitted as a succession of data packets,
      each data packet being internally organized into data fields and taking the form of a synchronization symbol header followed by a sequence of symbols obtained by applying a code to unencoded data,
      wherein at least certain data packets of the succession of data packets contain a synchronization symbol pattern within said sequence of symbols; and
   detecting the encoded navigation message by identifying said synchronization symbol pattern;
   wherein the unencoded data comprises a synchronization bit field, and
   wherein said synchronization symbol pattern within said sequence of symbols is obtained by application of said code to the synchronization bit field.

12. The GNSS positioning method according to claim 11, said method being an assisted GNSS positioning method.

13. The GNSS positioning method according to claim 11, wherein the steps of receiving and detecting are performed by a GNSS receiver comprising a non-transitory computer readable medium for storing a computer program with instructions causing the GNSS receiver to carry out said receiving and detecting steps when the computer program is run by the GNSS receiver.

14. The GNSS positioning method according to claim 11, wherein the steps of receiving and detecting are performed by a computer program product comprising non-transitory computer readable medium with computer program instructions causing a GNSS receiver to carry out said receiving and detecting steps when the computer program is run by the GNSS receiver.

15. The GNSS positioning method according to claim 11, wherein the step of detecting the navigation message further includes the step of identifying said synchronization symbol header.

* * * * *